(12) United States Patent
Djakovic

(10) Patent No.: US 7,490,249 B1
(45) Date of Patent: Feb. 10, 2009

(54) CONTENT PROTECTION AND AUTHENTICATION WITHOUT SECRET KEYS

(75) Inventor: Vladan Djakovic, San Francisco, CA (US)

(73) Assignee: Zotus, Inc., San Francisco, CA (US)

( * ) Notice: Subject to any disclaimer, the term of this patent is extended or adjusted under 35 U.S.C. 154(b) by 608 days.

(21) Appl. No.: 10/406,078

(22) Filed: Apr. 1, 2003

Related U.S. Application Data

(60) Provisional application No. 60/378,831, filed on May 9, 2002.

(51) Int. Cl.
   *G06F 12/14* (2006.01)
(52) U.S. Cl. ...................................... 713/193
(58) Field of Classification Search .................. 713/193
   See application file for complete search history.

(56) References Cited

U.S. PATENT DOCUMENTS

| | | | | |
|---|---|---|---|---|
| 4,351,982 | A | * | 9/1982 | Miller et al. ................... 380/30 |
| 5,185,797 | A | * | 2/1993 | Barrett et al. ............... 380/274 |
| 5,481,609 | A | * | 1/1996 | Cohen et al. ................ 380/227 |
| 5,488,661 | A | * | 1/1996 | Matsui ......................... 380/29 |
| 7,051,005 | B1 | * | 5/2006 | Peinado et al. ................. 705/57 |

OTHER PUBLICATIONS

Damgard, I. et al., "Multiple Encryption with Minimum Key", proceedings of Cryptography: Policy and Algorithms, Brisbane, Queensland, Australia, Lecture Notes in Computer Science 1029, pp. 156-164, Jul. 1995.
Campbell, K.W. et al., "DES is not a Group", Advances in Cryptology—Crypto '89, Springer-Verlag (1993), 512-520.
Maurer, Ueli M. et al., "Cascade Ciphers: The Importance of Being First", Journal of Cryptology, vol. 6, No. 1, pp. 55-61, 1993.

* cited by examiner

*Primary Examiner*—Kambiz Zand
*Assistant Examiner*—Aubrey H Wyszynski
(74) *Attorney, Agent, or Firm*—Mauriel Kapouytian & Treffert LLP; Michael Mauriel

(57) ABSTRACT

A clearinghouse authorizes a content provider to use a scrambler to scramble content using a content ID. The content provider provides the scrambled content to a content consumer. If the content consumer has a valid authorization, it can use a content descrambler and the content ID to descramble and access the content. Authorization takes the form of a electronically signed authority message including a device ID and the content ID. The authorization is valid for the content consumer if the device ID matches a corresponding value in the descrambler. The scrambler implements an irreducible scrambling function that can be performed quickly in special-purpose hardware but not on general purpose hardware or software. The scrambler and descrambler can also be used to authenticate the content consumer.

24 Claims, 7 Drawing Sheets

CONTENT PROTECTION AND AUTHENTICATION WITHOUT SECRET KEYS

CROSS-REFERENCE TO RELATED APPLICATION

This application claims the benefit of U.S. Provisional Application No. 60/378,831, filed May 9, 2002, and incorporated herein by reference.

BACKGROUND OF THE INVENTION

1. Field of the Invention

This invention pertains in general to data encryption using computer systems and more particularly to rights management for digital content.

2. Background Art

Broadband networking technology has become commonplace. For example, many households receive digital television signals via broadband cable and satellite distribution systems. Similarly, many households connect to the Internet via broadband connections provided by technologies such as cable modems and digital subscriber lines (DSL). Furthermore, digital radio and broadcast television technologies, as well as wireless broadband Internet access are also becoming more prevalent.

This pervasive access to broadband networking technology has made it easier for the typical consumer and other computer users to receive high-quality digital content. This content includes, for example, audio content, such as music, visual content, such as photographs, and multimedia content such as television programs and movies. Consumers also receive digital content via physical media such as compact disks (CDs) and DVDs.

The broadband network technology also makes it easier for consumers to share digital content with others. This sharing has led to an increase in the role of digital rights management (DRM) technology. In general, publishers and other content distributors seek to use DRM technology to provide authorized consumers with access to digital content while simultaneously preventing unauthorized consumers from accessing it.

Existing DRM schemes are flawed for a variety of reasons. For example, some DRM schemes use a secret key to encrypt content. The encrypted content is publicly available, but the secret keys are distributed to only the consumers authorized to use the keys to access the content. Due to the nature of content distribution, it is impractical to utilize different keys for different consumers and/or different content. Therefore, the entire DRM scheme is compromised if the secret keys become publicly available through compromising consumer equipment or other means.

Some DRM technologies attempt to protect the secret key by storing it in a tamper-proof device that theoretically cannot be breached by consumers. However, history has demonstrated that any tamper-proof device distributed to consumers will eventually be defeated and the secret keys will become available. For example, the secret keys utilized to protect DVDs were discovered only a few years after DVDs and corresponding DVD players became publicly available.

Therefore, there is a need in the art for a content protection scheme that does not rely on secret keys that are distributed to consumers.

BRIEF SUMMARY OF THE INVENTION

The above need is met by a content protection and authentication system that does not require content consumers to utilize secret keys. One embodiment of the system includes a clearinghouse, a content provider, and a content consumer. The clearinghouse provides the content provider and/or the content consumer with authorization to scramble/descramble content. The clearinghouse preferably has a signing key private counterpart that it can use to sign messages.

The content provider has a scrambler that it uses to scramble digital content. The scrambler includes a device ID that identifies the scrambler and a scrambler engine for scrambling the content. In one embodiment, the scrambler can be used to scramble content only after receiving a valid authority message from the clearinghouse for the content. A valid authority message is one that contains the device ID for the scrambler and is signed by the clearinghouse. The authority message also preferably includes one or more content IDs for content that the content provider is authorized to scramble.

The scrambler derives a scramble key from the content ID and uses it to scramble the content. In one embodiment, the scrambler implements an irreducible scrambling function that can be performed more quickly in special-purpose hardware than in general purpose hardware or software. The content provider provides the scrambled content and the content ID to the content consumer.

The content consumer has a descrambler that it uses to descramble the digital content. The descrambler is functionally similar to the scrambler and only descrambles content for which it has received a valid authority message. If the descrambler has received the appropriate authority, it derives the scramble key from the content ID and uses it to descramble the content.

For authentication, the content provider generates a bitstream and scrambles it based on a content ID. The content provider sends the scrambled bitstream and content ID to the content consumer. The content consumer, in turn, uses the content ID to descramble the bitstream and provides the original bitstream to the content provider. The action of providing the original bitstream to the content provider demonstrates that the content consumer has the capacity to quickly descramble the bitstream. This capacity serves to authenticate the content consumer.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE INVENTION

Figure 1A:
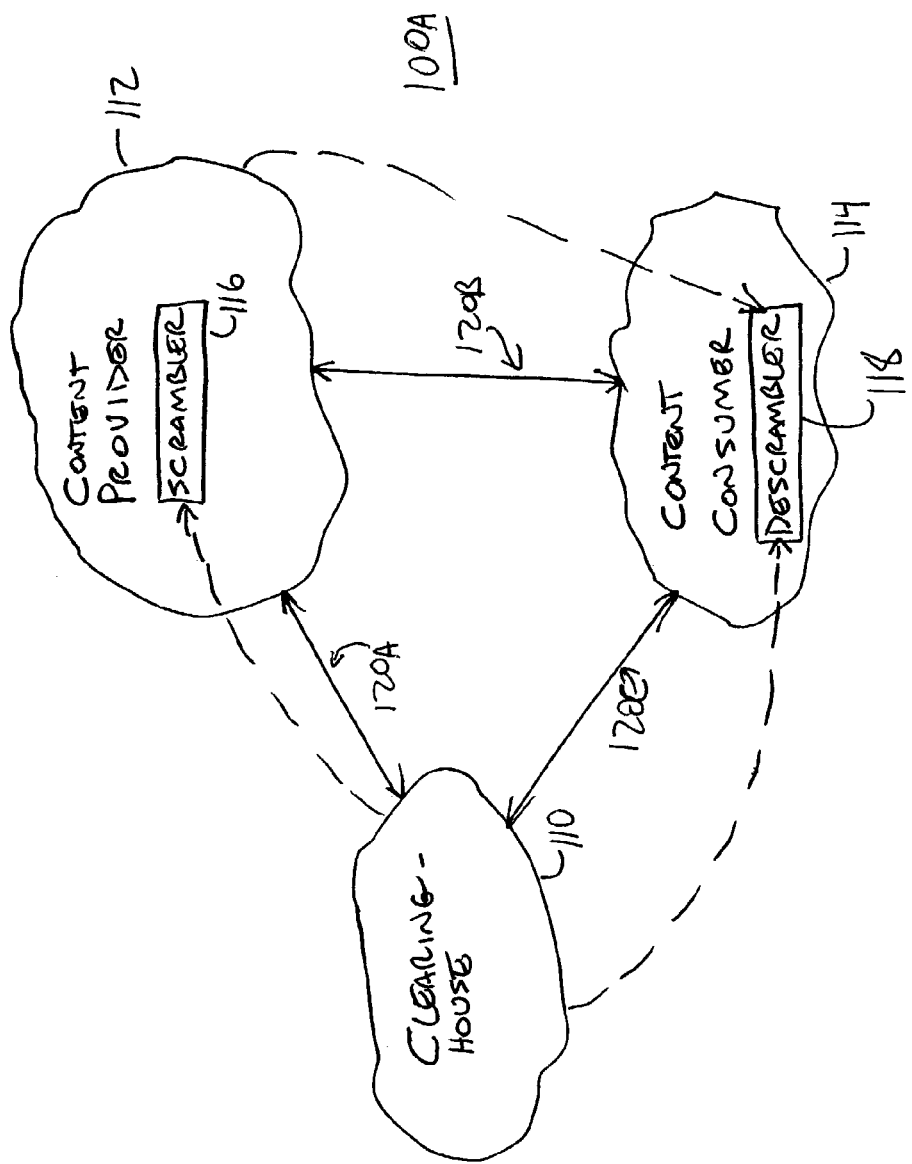
FIG. 1A is a high-level block diagram illustrating a system for providing digital content protection according to an embodiment of the present invention.

FIG. 1A is a high-level block diagram illustrating a system 100A for providing digital content protection according to an embodiment of the present invention. In the figures, like elements are identified with like reference numerals. A letter after the reference numeral, such as "112A," indicates that the text refers specifically to the element having that particular reference numeral. A reference numeral in the text without a following letter, such as "112," refers to any or all of the elements in the figures bearing that reference number (e.g. "112" in the text refers to reference numerals "112A" and/or "112B" in the figures).

The system 100A includes a clearinghouse 110, a content provider 112, and a content consumer 114. In general, the clearinghouse 110 authorizes the content provider 112 to scramble content using a content scrambler 116. The content provider 112 provides the scrambled content to the content consumer 114. If the content consumer 114 has the appropriate authorization, it can use a content descrambler 118 to descramble and thereby access the content.

Only one clearinghouse 110, content provider 112, and content consumer 114 are illustrated in FIG. 1A for purposes of clarity. Embodiments of the system can have multiple ones of each entity. Indeed, it is anticipated that embodiments of the system 100A will have thousands or millions of content consumers 114, hundreds or thousands of content providers 112, and one or more clearinghouses 110.

In one embodiment, the functionalities of the clearinghouse 110, content provider 112, and/or content consumer 114 are respectively implemented using one or more conventional computer systems including processors and memories and adapted to perform the functions attributed to the entities. These computer systems can be standalone computer systems or integrated into other devices, such as DVD players, radios, or other consumer electronics. In one embodiment, the functionalities are organized into one or more "modules." As used herein, the term "module" refers to computer program logic for providing the specified functionality. A module can be implemented in hardware, firmware, and/or software. In addition, the functionalities attributed to the entities of FIG. 1 can also be performed, at least in part, by human operators or other entities. For example, an action attributed to the content provider 112 herein might be performed by a human operator of the content provider, a module within the content provider, and/or a module within the scrambler associated with the content provider.

The clearinghouse 110, content provider 112, and content consumer 114 communicate using a network 120. The network links 120A, 120B, 120C can be unidirectional and/or bi-directional links. Some embodiments may lack one or more of the network links illustrated in FIG. 1A. For example, certain embodiments lack a link 120C between the content consumer 114 and the clearinghouse 110.

In one embodiment, the network 120 is a computer network, such as the Internet, that couples the three entities of FIG. 1. As such, the network links 120 can be wired and/or wireless. The network 120 can also utilize dedicated or private communications links that are not necessarily part of the Internet.

In the computer network embodiment, the entities illustrated in FIG. 1 use conventional communications technologies such as the transmission control protocol/Internet protocol (TCP/IP) to communicate over the network 120. The entities of FIG. 1 also use conventional communications protocols such as the hypertext transport protocol (HTTP), the simple mail transfer protocol (SMTP), the file transfer protocol (FTP), etc. The entities can also engage in secure communications using technologies including the secure sockets layer (SSL), Secure HTTP, and/or virtual private networks (VPNs). The communicated messages utilize conventional data encodings such as hypertext markup language (HTML), extensible markup language (XML), etc.

In one embodiment, at least some of the network links 120 are not electronic. For example, the network link 120B between the content provider 112 and the content consumer 114 can be implemented by the content provider 112 making DVDs available for purchase at retail stores or mailing DVDs or other media directly to the content consumer. Similarly, this network link 120B can be implemented by broadcasting a signal via a cable distribution network or wireless transmissions, etc. Similarly, the clearinghouse 110 can provide authorization to the content provider 112 via voice telephone, facsimile, etc. In addition, there can be intermediaries on the network 120 between the illustrated entities.

Turning now to the specific entities illustrated in FIG. 1, in one embodiment, the clearinghouse 110 is the entity that ultimately controls the digital content protection system 100A. To this end, the clearinghouse 110 preferably distributes or otherwise makes available the scramblers 116 and descramblers 118. The clearinghouse 110 can selectively activate the distributed scramblers 116 and descramblers 118. Accordingly, the clearinghouse 110 can create a security policy for implementing digital rights management (DRM) by selectively allocating certain rights to certain scramblers 116 and descramblers 118.

The clearinghouse 110 preferably uses public key cryptography to electronically sign authorizations. As is known in the art, public key cryptography utilizes a signing key having public and private counterparts. Each key is a mathematical value, such as a long integer, that is usually generated according to a random or pseudorandom technique. The public and private key counterparts are related such that a message signed with the private key can be verified with the public key. The signing key is preferably generated using a conventional technique, such as a technique utilizing the Diffie-Hellman, Knapsack, DSA, and/or RSA key-generation schemes. The clearinghouse's public key counterpart is publicly available and known to the other entities in the system 110A. The private key counterpart, in contrast, is preferably kept confidential using conventional security techniques.

The content provider 112 is an entity that uses the scrambler 116 under authority of the clearinghouse 110 to issue scrambled digital content. The dashed line from the clearinghouse 110 to the scrambler 116 represents the authority. For example, the content provider 112 can be a web site operator, a television network, an Internet service provider, a radio station, a music label/distributor, etc. The scrambled content cannot be descrambled within a useful time period without utilizing a descrambler 118 having appropriate authority.

In one embodiment, the content provider 112 utilizes the scrambler 116 to scramble content generated and issued in real-time. For example, the content provider can use the scrambler 116 to scramble a television broadcast, radio program, TCP/IP packets, or any other stream of data as the stream is created and transmitted to the content consumer 114. In another embodiment, the content provider 112 utilizes the scrambler 116 to scramble non-streamed content, such as content embodied on CDs and DVDs or made available for download on the network 120.

The content consumer 114 is an entity that receives the scrambled content from the content provider 114 and uses the descrambler 118 to descramble it. In one embodiment, the content consumer 114 receives authority from the clearinghouse 110 to descramble the content (represented by the dashed arrow from the clearinghouse to the descrambler 118). In another embodiment, content consumer 114 receives the authority from the content provider 112 (represented by the dashed line from the content provider 112 to the descrambler 118). The content consumer can be embodied in a consumer electronic device such as a CD player, DVD player, television, desktop or laptop computer system, etc. In one embodiment, the content consumer 114 redistributes the content to downstream consumers.

Preferably, the content consumer 114 uses the descrambler 118 to descramble content in real-time. Thus, the content consumer 114 can descramble and consume streaming content as the content arrives. For example, if the content consumer 114 includes a television receiving scrambled television signals, the content consumer 114 can preferably descramble the signals quickly enough to display the television program without interruption. In another embodiment, the content consumer 118 uses the descrambler 118 to descramble the content in a non-real-time manner.

As described above, the system 100A of FIG. 1A can be utilized as a digital rights management system. The clearinghouse 110 controls whether the content provider 112 has the right to scramble content. Similarly, the clearinghouse 110 and/or the content provider 112 control whether the content consumer 114 has the right to descramble the content. Entities lacking the appropriate rights are unable to scramble and/or descramble the content within a useful time period. The content provider 112 can therefore make the scrambled content publicly available because only authorized content consumers 114 can use it.

Figure 1B:
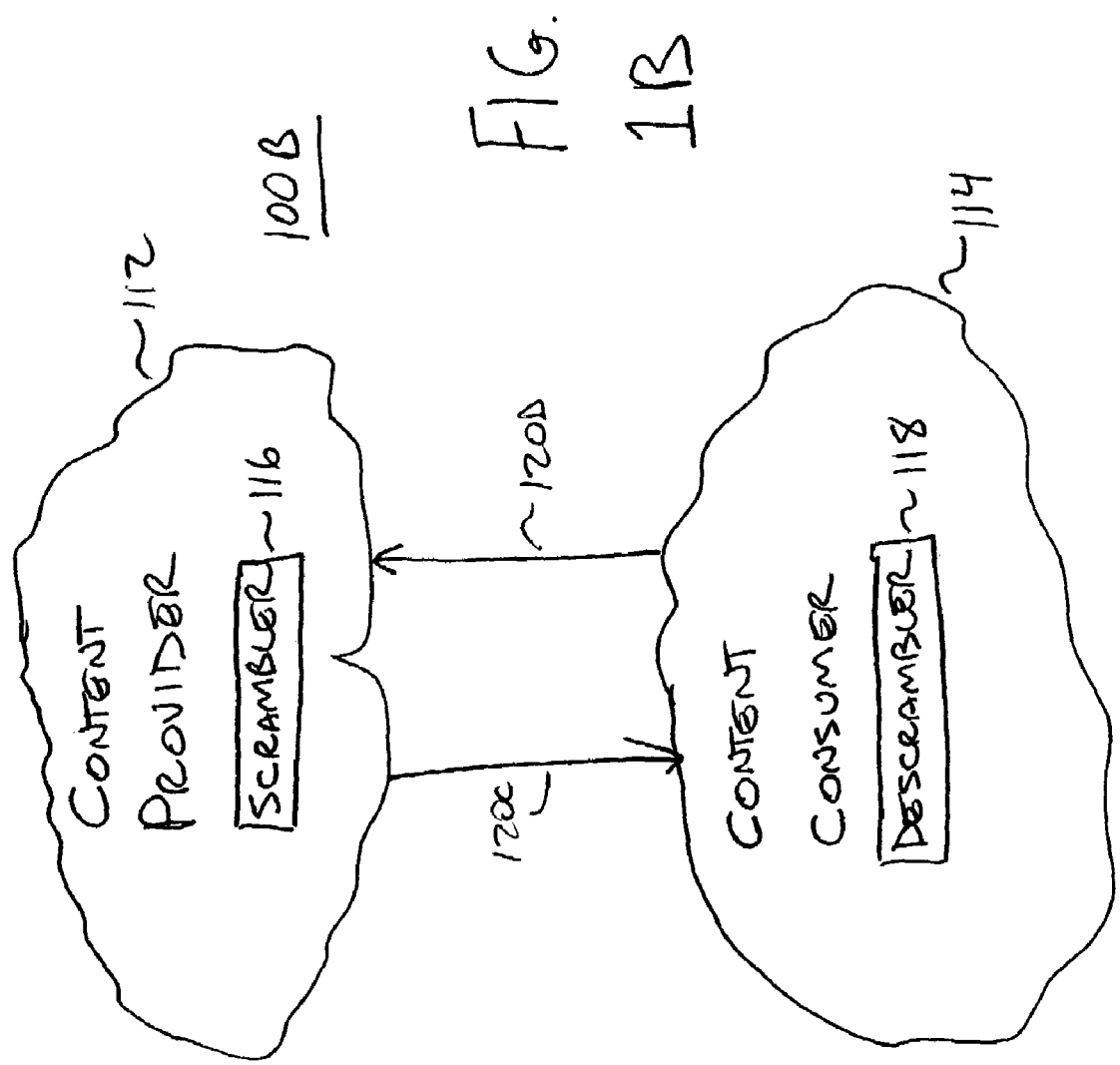
FIG. 1B is a high-level block diagram illustrating a system utilizing the content protection system to provide authentication according to one embodiment of the present invention.

FIG. 1B is a high-level block diagram illustrating a system 100B utilizing the content protection system to provide authentication according to one embodiment of the present invention. FIG. 1B again illustrates the content provider 112 and content consumer 114 in communication via a network 120. In the system 100B of FIG. 1B, the content provider 112 can be the same entity as described with respect to the system of FIG. 1A. In addition, the content provider 112 can also be any entity seeking to authenticate the content consumer 114. As such, the term "content provider" includes entities that do not provide "content."

Similarly, in the system 100B of FIG. 1B, the content consumer 114 can be the same entity as described with respect to the system of FIG. 1A. Moreover, the content consumer 114 can also be any entity seeking to authenticate itself to the content provider 112. Therefore, the term "content consumer" includes entities that do not explicitly consume "content" other than the data utilized to perform authentication.

The scrambler 116 and descrambler 118 respectively utilized by the content provider 112 and the content consumer 114 are preferably functionally equivalent to the scrambler and descrambler described with respect to the system 100A of FIG. 1A. The system 100B of FIG. 1B does not necessarily include a clearinghouse 110. Accordingly, in one embodiment, the content provider 112 and content consumer 114 can use the scrambler 116 and descrambler 118, respectively, without receiving explicit authorization from another entity.

In general, the content provider 112 authenticates a content consumer 114 by generating a sequence of bits (called a "bitstream") and scrambling the bitstream with the scrambler 116. In one embodiment, the content provider 112 scrambles the bitstream in such a manner that only a specific descrambler 118 can be used to descramble it. The content provider 112 sends the scrambled bitstream to the content consumer 114 (this communication is represented by network link 120C).

The content consumer 114, in turn, utilizes the descrambler 118 to descramble the bitstream and generate the unscrambled bitstream. The content consumer 114 sends the bitstream back to the content provider 112 (this communication is represented by network link 120D). Upon receiving the descrambled bitstream, the content provider 112 "knows" that the content consumer 114 has a descrambler 118 able to descramble the message. In one embodiment, the content provider 112 also "knows" which content consumer 114 possesses the specific descrambler 118 able to descramble the bitstream and, therefore, the content provider can identify the content consumer. In another embodiment, the content consumer 112 does not "know" who possesses the descrambler.

Figure 2:
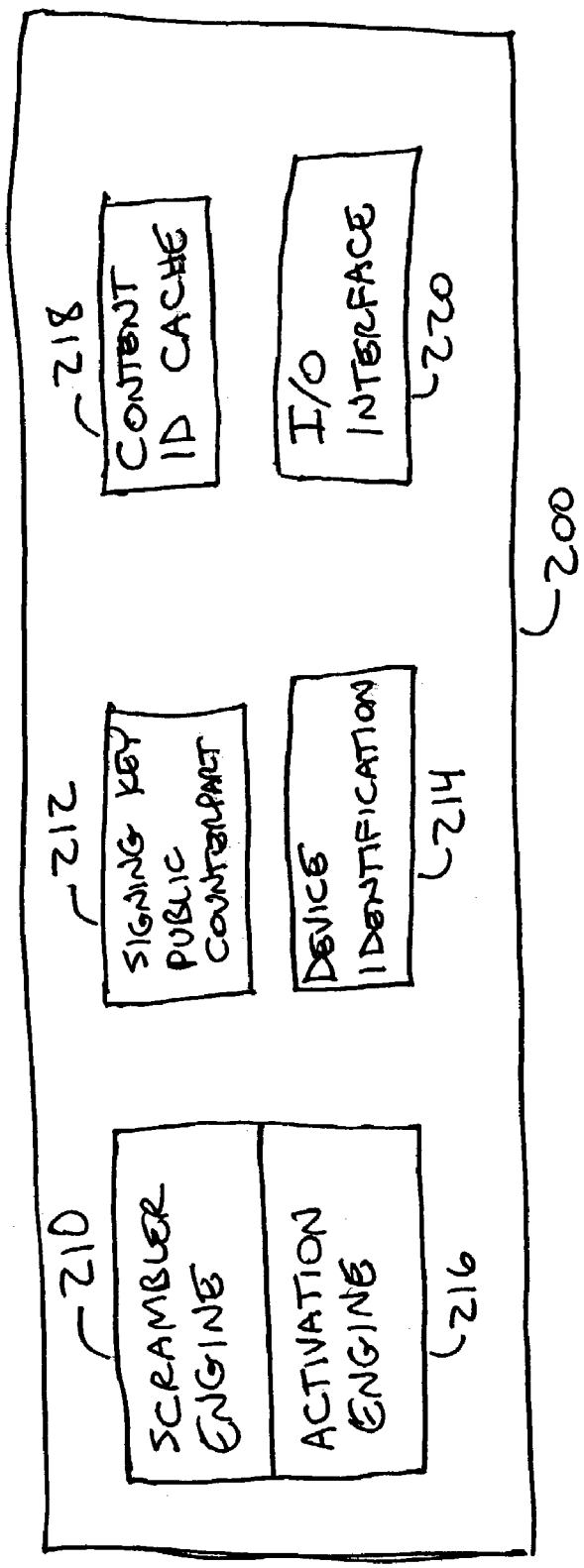
FIG. 2 is a high-level block diagram of a scrambler/descrambler according to one embodiment of the present invention.

FIG. 2 is a high-level block diagram of a scrambler/descrambler 200 according to one embodiment of the present invention. In one embodiment, the scrambler 116 and descrambler 118 are functionally equivalent and a single device can act in both capacities. In another embodiment, the scrambler 116 and descrambler 118 are quite similar, except that the engines providing the scrambling and descrambling functionality are different. In yet another embodiment, the two devices are different.

For purposes of clarity, this description refers to the scrambler/descrambler 200 of FIG. 2 as a "scrambler" possessing a "scrambler engine" 210, even though the same device can also be used for descrambling. It should be understood, therefore, that the term "scrambler" and "scramble" as used herein also mean "descrambler" and "descramble," respectively, and vice-versa.

In one embodiment, the scrambler 200 is embodied in a special-purpose semiconductor package. For example, the scrambler 200 can be comprised of one or more application-specific integrated circuits (ASICs) adapted for mounting on a printed circuit board. The inherent high cost and traceability of chip manufacturing significantly reduces the risk that third parties will produce and/or distribute unauthorized scramblers. Moreover, the high cost of probing and/or modifying packaged chips will discourage third parties from attempting to utilize altered scramblers in the systems of FIGS. 1A and 1B.

The semiconductor package or other medium carrying the scrambler functionality can be distributed in many different ways. For example, the scrambler 200 can be distributed as a portable "key" that can be inserted into a CD or DVD player in order to enable the player to descramble content. The scrambler 200 can also be integrated into another device such as a computer system, consumer electronic device, dedicated scrambling system, etc.

Turning now to the scrambler 200 of FIG. 2, the scrambler includes a scrambler engine module 210 (referred to as the "scrambler engine") for receiving an input bitstream and producing a scrambled output bitstream. The scrambler engine 210 scrambles the bitstream based on a digital value referred to as the "scramble key." In one embodiment, the algorithm utilized by the scramble engine 210 is symmetric. That is, the scramble key is also used to descramble content scrambled with that key.

Preferably, the scrambler engine 210 can scramble content in real-time. As used herein, "real-time" means "sufficiently quick that there is an immaterial delay between the introduction of an input bitstream and the generation of a corresponding scrambled output bitstream." The exact measure of this delay can depend on many factors, including the specific scrambling algorithm, the hardware implementation of the engine, etc.

The scrambler 200 also includes a signing key public counterpart module 212 for holding a signing key public counterpart. In one embodiment, the signing key public counterpart is the public key of the clearinghouse 110 or other entity providing authority for activating the scrambler 200. The signing key public counterpart 212 is preferably hard-coded into the scrambler 200 so that the value cannot easily be altered.

In addition, the scrambler 200 includes a device identification (ID) module 214 holding a device ID for the scrambler. In one embodiment, the device ID is a value uniquely identifying the scrambler 200. In another embodiment, one or more scramblers 200 share the same device ID. In another embodiment, the scrambler 200 includes multiple device ID modules 214, each of which can be selectively utilized and/or permanently and irreversibly disabled. The device ID in the device ID module 214 is preferably hard-coded into the scrambler 200 so that it cannot easily be altered.

An activation engine module 216 (referred to herein as the "activation engine") selectively activates the scrambler engine 210. In one embodiment, the activation engine 216 activates the scrambler engine 210 only for use with authorized content. Content is authorized if the scrambler 200 receives a content ID for the content in a valid authority message. In one embodiment, an authority message is valid if its signature is validated using the signing key public counterpart, it contains the device ID of the scrambler 200, and it includes one or more content IDs. Since only the clearinghouse 110 has access to the signing key private counterpart in one embodiment, only the clearinghouse can create a valid authority message. The scramble key for content is preferably derived from the content's ID. Preferably, the activation engine 216 and scrambler engine 210 are embedded in the same chip or other semiconductor package. This close physical relationship between the activation 216 and scrambler 210 engines makes it difficult to tamper with the engines in an attempt to obtain unauthorized access to content.

The scrambler 200 optionally includes a content ID cache module 218 (referred to herein as the "content ID cache") for holding content IDs received in valid authority messages. Thus, the content ID cache 218 effectively serves as a database identifying the content that the scrambler 200 is authorized to scramble and the corresponding scramble keys. In another embodiment, the scrambler 200 does not include the content ID cache 218. Instead, the content IDs are stored (preferably as authority messages) in an external memory accessible to the scrambler 200. In yet another embodiment, the scrambler 200 does not store the content IDs except while the IDs are being used to scramble content.

An input/output interface module 220 (referred to herein as the "I/O interface") allows the scrambler 200 to communicate with external devices. The nature of the I/O interface 220 depends upon the particular embodiment of the scrambler 200. In an embodiment where the scrambler 200 is integrated into a computer system and/or consumer electronic device, the I/O interface 220 can include a data bus that allows the transfer of parallel and/or serial data to/from the scrambler 200. For example, in an embodiment where the scrambler 200 is used to perform descrambling the I/O interface 220 can include digital inputs for receiving the scrambled bitstream, scramble key, and other data and analog outputs for outputting the descrambled content. In embodiments where the scrambler 200 is a stand-alone device, the I/O interface 220 can include a universal serial bus (USB) connection, a IEEE 1394 (FireWire) interface, a Bluetooth interface, an 802.11 wireless interface, an RJ-45 connector, etc.

Figure 3:
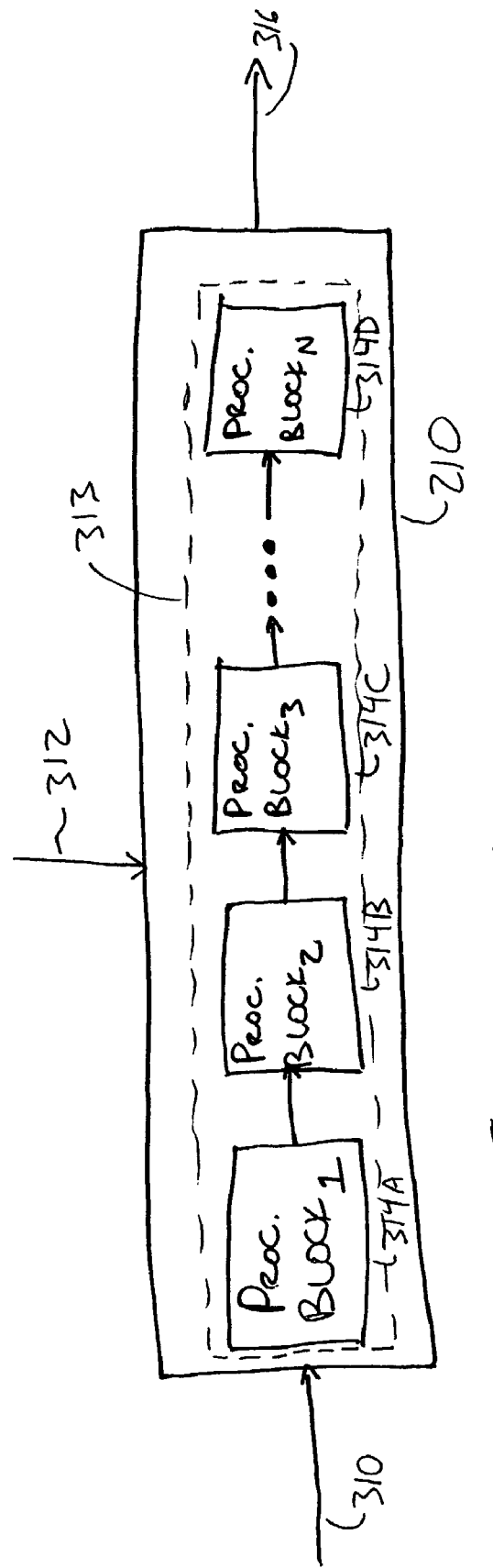
FIG. 3 is a high-level block diagram illustrating a detailed view of the scrambler engine according to an embodiment of the present invention.

FIG. 3 is a high-level block diagram illustrating a detailed view of the scrambler engine 210 according to an embodiment of the present invention. The engine has two logical inputs 310, 312 and one logical output 316. One input 310 receives the bitstream representing the digital content. The other input 312 receives the scramble key. The output 316 provides the scrambled bitstream.

A scramble generation module 313 performs the actual scrambling. In one embodiment, the scramble generation module 313 is a dedicated hardware circuit that implements an irreducible scrambling function having many operations. As used herein, a scrambling function is "irreducible" if it cannot be replicated using substantially fewer integral operations. Since a dedicated hardware circuit can perform the operations of an irreducible scrambling function in parallel, the dedicated circuit can perform the scrambling function much more quickly than can software and/or general-purpose hardware. For example, a scramble that the scramble generation module 313 can generate in less than one second might require an hour, a day, or a year to perform using software or general-purpose hardware.

In one embodiment, the scramble generation module 313 includes multiple discrete processing blocks 314 arranged in cascading series. Although only four processing blocks 314 are illustrated in FIG. 3, embodiments of the present invention can have 16, 32, 64, 128, or any other amount of blocks. In one embodiment, each processing block 314 performs the same scrambling function on its input data. In another embodiment, different processing blocks 314 within the scramble generation module 313 perform different scrambling functions.

In one embodiment of the scrambler engine 210, the blocks 314 within the scramble generation module 313 utilize the Data Encryption Standard (DES) to scramble the input bitstream. DES is effective because it can be implemented in specialized hardware much more efficiently than in general purpose software and/or hardware. Moreover, it has been mathematically proven that DES is irreducible, meaning that a series of N DES processing blocks cannot be reduced to fewer than N blocks. Accordingly, a series of, say, 128 dedicated hardware DES processing blocks 314 in the scramble generation module 313 can scramble an input bitstream much faster than an equivalent implementation using software and/or general-purpose hardware.

As mentioned above, the scramble key is derived from the content ID. In one embodiment, the content ID, itself a bitstream, is partitioned into 56-bit segments and each segment is used as a scramble key for a DES processing block 314. For example, in one embodiment the segment containing bits 1-56 of the content ID is utilized as the scramble key for the first processing block 314A, the segment containing bits 56-112 is utilized as the scramble key for the second processing block 314B, etc. If there are more processing blocks 314 than 56-bit segments of the content ID, one embodiment repeats the segments while another embodiment uses "filler" bits as scramble keys for the segments. In one embodiment, the filler bits are communicated over a separate channel than the content ID. In another embodiment, the filler bits are derived from the content ID using a deterministic algorithm. For purposes of clarity, this description often refers to a single scramble key to mean the sets of bits that are used as scramble keys in the individual processing blocks.

Figure 4:
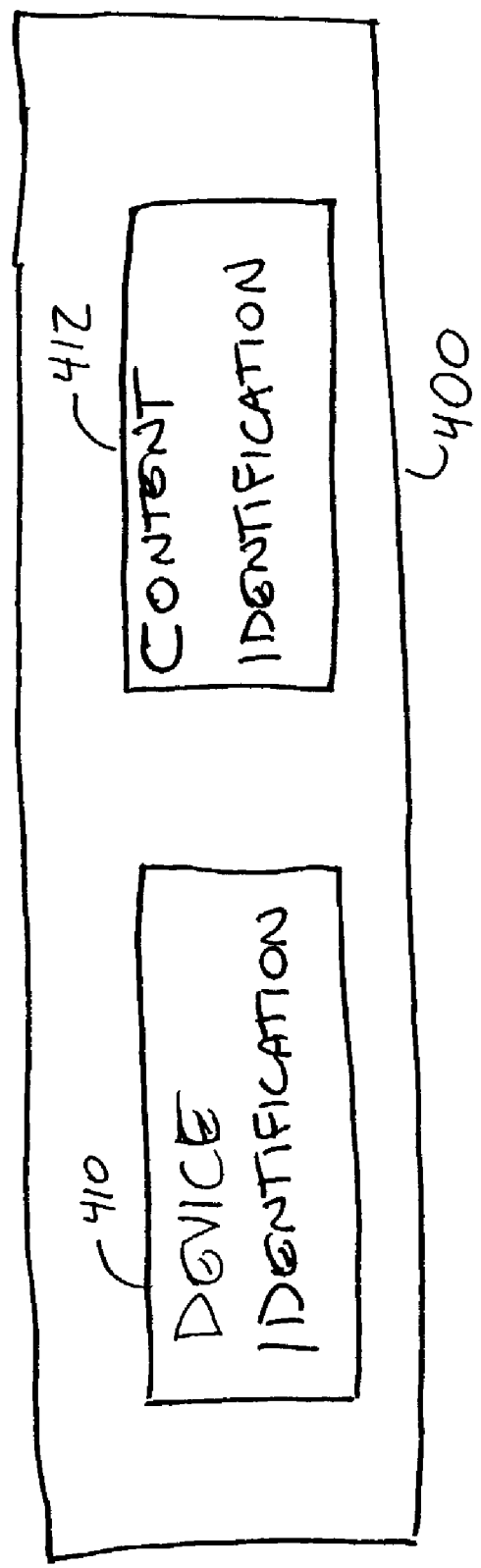
FIG. 4 is a high-level block diagram illustrating an authority message according to one embodiment of the present invention.

FIG. 4 is a high-level block diagram illustrating an authority message 400 according to one embodiment of the present invention. The authority message 400 is typically sent from the clearinghouse 110 to the content provider 112 and/or content consumer 114 to authorize use of the scrambler 200. The authority message 400 includes a device ID 410 which matches the device ID 214 of the specific scrambler 200 for which the authority message is valid. In addition, the authority message 400 includes at least one content ID 412 identifying the specific content for which the authority message is valid and serving as the basis of the scramble key for the content. As described above, the authority message 400 is preferably signed using the clearinghouse's private key.

Figure 5:
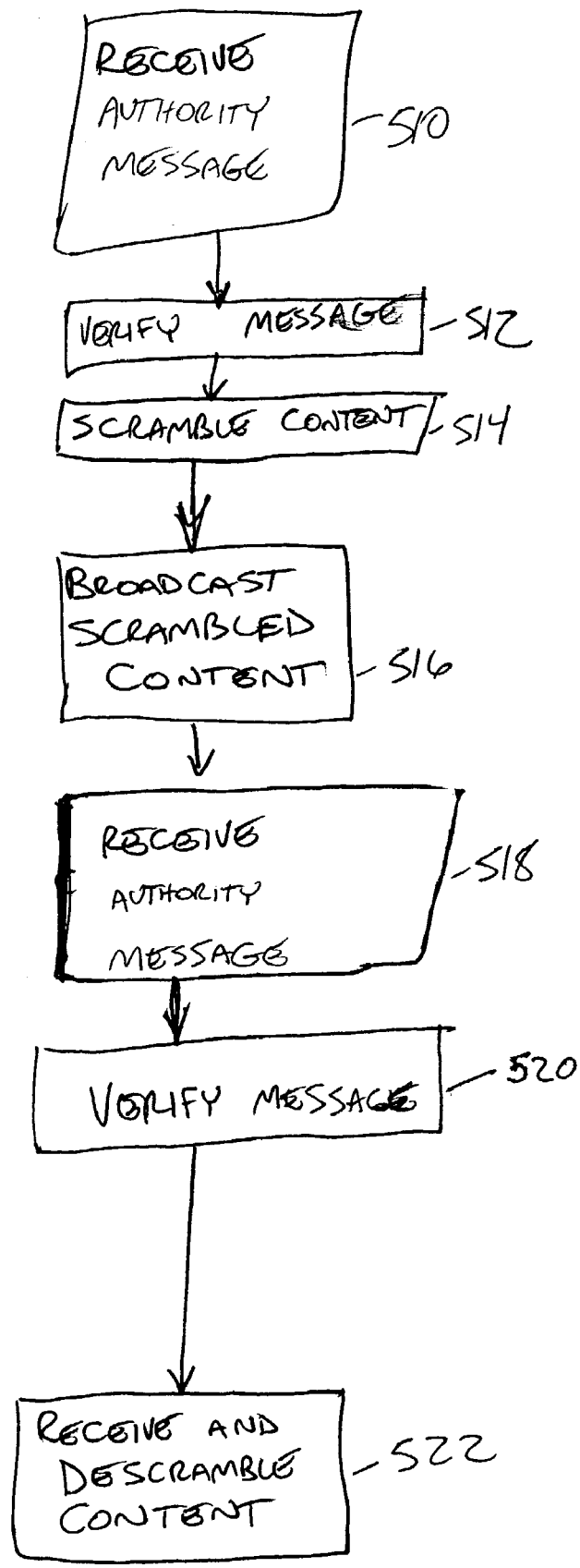
FIG. 5 is a flowchart illustrating the operation of the system for providing digital content protection illustrated in FIG. 1A.

FIG. 5 is a flowchart illustrating the operation of the system 100A for providing digital content protection illustrated in FIG. 1A. It should be understood that steps of the flowcharts illustrated herein are illustrative only, and that other embodiments of the present invention may perform different and/or additional steps than those described herein in order to perform different and/or additional tasks. Furthermore, the steps can be performed in different orders than the ones described herein.

The content provider 112 receives 510 an authority message 400 from the clearinghouse 110. The scrambler 116 at the content provider 112 uses the signing key public counterpart 212 to verify the signature of the authority message 400 and thereby verify 512 that the authority message was created by the clearinghouse 110. The scrambler 116 also obtains the device ID 410 and content ID 412 contained in the message 400. In one embodiment, the content provider 112 or scrambler 116 generates the content ID 412 internally or obtains it from a source other than the clearinghouse 110. If the device ID in the authority message matches the device ID 214 in the scrambler 116, the content provider 112 derives the scramble key from the content ID 412 and scrambles 514 the content. The content provider 112 broadcasts 516 or otherwise makes the scrambled content and content ID available to the content consumer 114.

The content consumer 114, in turn, receives 518 an authority message 400 from the clearinghouse 110, content provider 112, or another entity. The content consumer's descrambler 118 uses the signing key public counterpart 212 to verify the signature of the authority message 400 and thereby verify 520 that the message was created by an entity having the signing key private counterpart. In addition, the descrambler 118 obtains the device ID 410 and content ID 412 from the authority message 400 and verifies that the device ID matches the device ID 214 hard-coded into the descrambler 120.

At some point not necessarily coincident with the reception of the authority message, the content consumer 114 receives 522 the scrambled content from the content provider 112. The content consumer 114 also obtains the content ID for the content. The content ID can be sent with the content or via a separate communications channel. The descrambler 118 verifies that it has received a valid authority message for this content ID and, if so, uses the content ID to generate the descramble key and descrambles 522 the content.

Figure 6:
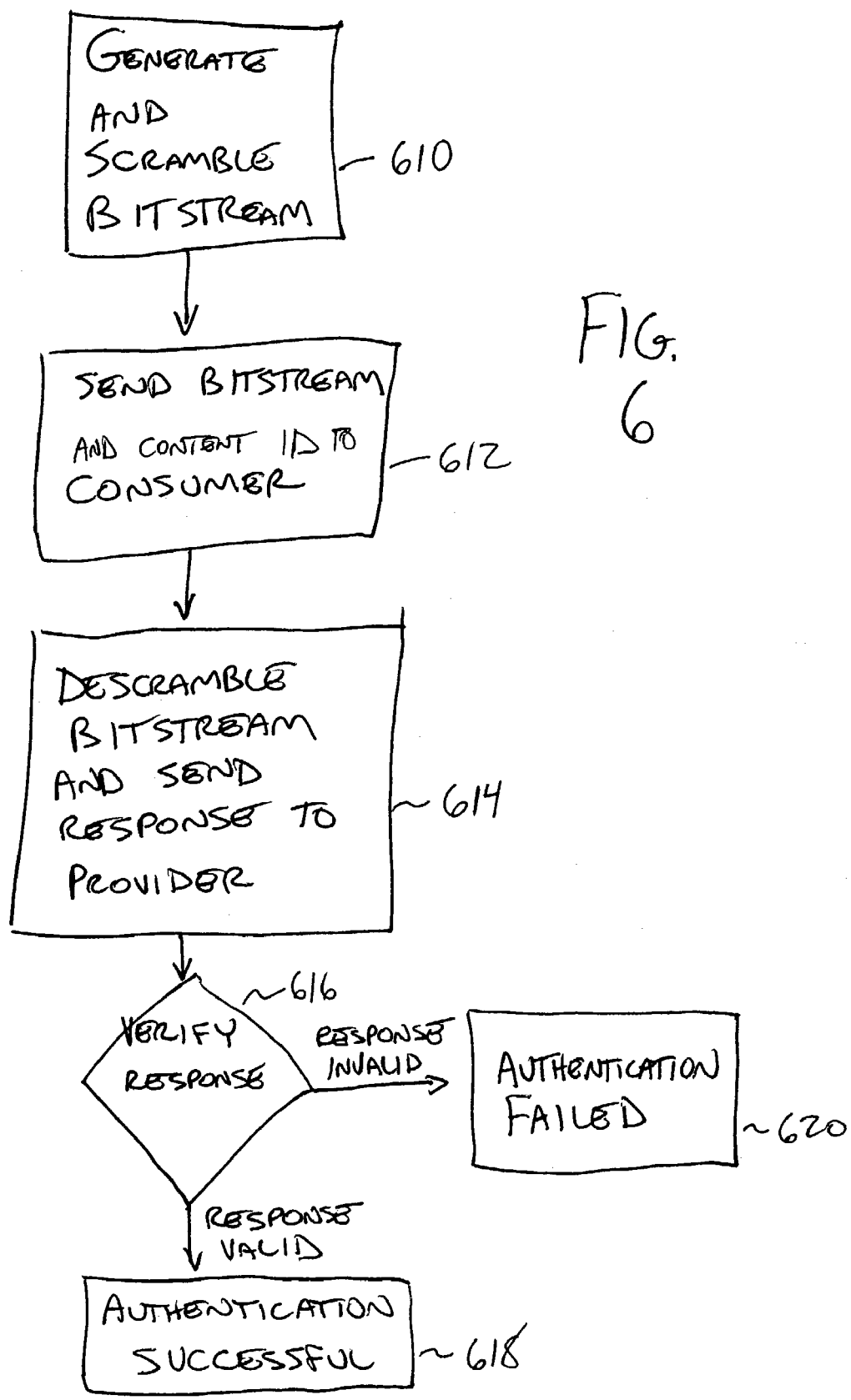
FIG. 6 is a flowchart illustrating the operation of the system for utilizing the content protection system to provide authentication according to one embodiment of the present invention.

FIG. 6 is a flowchart illustrating the operation of the system 100B for utilizing the content protection system to provide authentication according to one embodiment of the present invention. The content provider 112 generates a bitstream. In one embodiment, the bitstream contains a timestamp or another value that represents a time or position in a sequence at which the bitstream was generated along with another value (to ensure that the bitstream cannot be deduced). In another embodiment, the bitstream is a random value. The content provider 112 also generates or otherwise obtains a content ID and uses it to scramble the bitstream.

In one embodiment, the content provider 112 provides an additional level of security by creating an authority message 400 containing the device ID 410 of the descrambler 118 or descramblers authorized to take part in the authentication scheme and the content ID 412. The content provider signs the authority message 400 using a signing key private counterpart.

In the embodiment without the authority message 400, the content provider sends 612 the scrambled bitstream and the content ID to the content consumer 114. The content consumer 114 derives the descramble key from the content ID and uses the descrambler 118 to descramble 614 the bitstream. In the embodiment with the authority message 400, the content provider sends 612 the scrambled bitstream and the authority message to the content consumer 114. The content consumer 114 uses its signing key public counterpart 212 to verify that it has authority to proceed and then uses the content ID and descrambler 118 to descramble 614 the bitstream. The content consumer sends 614 a response including the descrambled bitstream to the content provider 112.

The content provider 112 verifies 616 that the response from the content consumer 114 is valid. In one embodiment, a response is valid if it contains the descrambled bitstream. In another embodiment, the content provider 112 uses additional factors to determine whether a response is valid. For example, the content provider 112 may treat a response as valid only if it is received within a certain time interval, such as within 10 seconds from when the scrambled bitstream and/or authority message is provided to the content consumer. If the response is valid, then the authentication is successful 618. The content consumer 114 has, in essence, authenticated itself by demonstrating that it has the capacity to perform a function (descrambling) that can be performed efficiently only by one possessing the descrambler. Conversely, if the response is invalid, the authentication fails 620.

In sum, the present invention provides digital content protection and authentication without the use of secrets anywhere in the system except in the clearinghouse 110. The systems utilize a special-purpose scrambler/descrambler 200 that can perform scrambling and descrambling operations much more efficiently than software and/or general-purpose hardware. Accordingly, content provided by the content provider 112 is useful to only those content consumers 114 having authorized descramblers 118 because only those consumers can access the content in a timely fashion. Moreover, an entity that demonstrates the capacity to quickly perform the descrambling operation is authenticated because only the entity having the authorized descrambler 118 can perform this operation.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A scrambler for scrambling digital content, the scrambler comprising:
   a device ID module for holding a value identifying the scrambler;
   a selectively-activated scrambler engine module for scrambling digital content responsive to a content ID, the scramble engine module comprises a scramble generation module adapted to scramble the digital content using an irreducible scrambling function including a plurality of scrambling functions, scrambling the digital content includes utilizing the irreducible scrambling function including the plurality of component scrambling functions, the plurality of component scrambling functions are executed by a plurality of processing blocks, the scrambling includes scrambling the digital content using a non-secret scramble key, and the scrambled digital content is provided for use by a content consumer, the content consumer including a plurality of hardware-based processing blocks arranged to execute a plurality of component descrambling functions of an irreducible descrambling function to descramble the scrambled digital content without using a secret descramble key; and
   an activation engine module for activating the scrambler engine responsive to receipt of an authority message including the value identifying the scrambler and the content ID.

2. The scrambler of claim 1, further comprising:
   a signing key public counterpart module for holding a signing key public counterpart, the activation engine module is adapted to use the signing key public counterpart to verify the authority message.

3. The scrambler of claim 1, further comprising:
   a content ID cache module for caching the received content ID to enable subsequent activation of the scrambler engine module.

4. The scrambler of claim 1, wherein the scramble generation module scrambles the digital content responsive to the non-secret scramble key and the non-secret scramble key is derived from the content ID.

5. The scrambler of claim 1, wherein the scrambler engine module and activation engine module are embodied in a tamper-resistant application-specific integrated circuit (ASIC).

6. The scrambler of claim 1, wherein the scramble generation module comprises a plurality of cascading processing blocks.

7. The scrambler of claim 6, wherein segments of the content ID are utilized as non-secret scramble keys for the cascading processing blocks.

8. The scrambler of claim 1, wherein the irreducible scrambling function is based on the data encryption standard (DES).

9. A method of protecting digital content, comprising:
   scrambling the digital content utilizing an irreducible scrambling function including a plurality of component scrambling functions, the plurality of component scrambling functions are executed by a plurality of processing blocks, and the scrambling includes scrambling the digital content using a non-secret scramble key; and
   providing the scrambled digital content for use by a content consumer, the content consumer including a plurality of hardware-based processing blocks arranged to execute a plurality of component descrambling functions of an irreducible descrambling function to descramble the scrambled digital content without using a secret descramble key.

10. The method of claim 9, wherein scrambling the digital content comprises:
    deriving a plurality of non-secret scramble keys from a content identifier identifying the digital content;
    the plurality of processing blocks comprise a plurality of block ciphers, and the plurality of block ciphers are adapted to scramble the digital content responsive to ones of the plurality of non-secret scramble keys.

11. The method of claim 10, wherein the plurality of processing blocks are arranged in a cascading sequence.

12. The method of claim 9, wherein the irreducible scrambling function is based on the data encryption standard (DES).

13. The method of claim 9, further comprising providing an authority message including a content identifier (ID) identifying the digital content to the content consumer, wherein providing the authority message to the content consumer comprises:
    creating a message including the content ID and a device ID associated with the content consumer; and
    signing the message utilizing a signing key private counterpart.

14. The method of claim 13, wherein the content identifier is non-secret.

15. The method of claim 13, wherein the authority message is non-secret.

16. The method of claim 9, further comprising:
    by the content consumer:
    verifying that an authority message including a content identifier (ID) identifying the digital content to the consumer is valid; and
    responsive to a positive verification of the authority message, descrambling the scrambled digital content.

17. The method of claim 16, wherein verifying that the authority message is valid comprises:
    utilizing a signing key public counterpart to verify an electronic signature associated with the authority message.

18. The method of claim 16, wherein verifying that the authority message is valid comprises:
    verifying that the authority message includes a device ID matching a device ID associated with the content consumer.

19. The method of claim 9, wherein the content consumer is adapted to descramble the scrambled digital content using a non-secret descramble key.

20. The method of claim 19, wherein the non-secret scramble key and the non-secret descramble key are the same.

21. A method of authenticating an entity, comprising:
    scrambling a digital bitstream using a non-secret scramble key to produce a scrambled digital bitstream, scrambling the digital bitstream includes utilizing an irreducible scrambling function including a plurality of component scrambling functions, the plurality of component scrambling functions are executed by a plurality of processing blocks;
    providing the non-secret scramble key and the scrambled digital bitstream to the entity being authenticated, the entity being authenticated is a content consumer, the content consumer including a plurality of hardware-based processing blocks arranged to execute a plurality of component descrambling functions of an irreducible descrambling function to descramble the scrambled digital bitstream without using a secret descramble key;

receiving a response from the entity being authenticated; and determining whether the response authenticates the entity.

22. The method of claim 21, wherein determining whether the response authenticates the entity comprises:

determining whether the response includes the digital bitstream.

23. The method of claim 21, wherein determining whether the response authenticates the entity comprises:

authenticating the entity responsive to whether the response from the entity was received within a predetermined amount of time from when the scrambled digital bitstream and/or the non-secret scramble key was provided to the entity.

24. The method of claim 21, further comprising:

establishing an authority message identifying the entity being authenticated and the non-secret scramble key; and providing the authority message to the entity being authenticated;

only the identified entity can utilize the authority message to generate a response authenticating the entity.

* * * * *